United States Patent [19]

Yamamoto et al.

[11] Patent Number: 4,987,332

[45] Date of Patent: Jan. 22, 1991

[54] ROBOT HAND FOR ELECTROSTATICALLY APPLYING THIN WORKPIECE TO MOLD

[75] Inventors: Tadashi Yamamoto, Tokyo; Kazumitsu Takai, Misato; Akira Shimizu, Kasukabe, all of Japan

[73] Assignee: Pentel Kabushiki Kaisha, Japan

[21] Appl. No.: 414,764

[22] Filed: Sep. 29, 1989

[30] Foreign Application Priority Data

Sep. 30, 1988 [JP] Japan .................................. 63-246731
Mar. 31, 1989 [JP] Japan .................................. 1-082991

[51] Int. Cl.$^5$ ........................ H02N 1/00; B29C 49/24
[52] U.S. Cl. ........................................ 310/309; 310/42; 425/504
[58] Field of Search .................. 310/43, 45, 80, 83, 310/309, 42; 414/6, 131; 425/503, 504

[56] References Cited

U.S. PATENT DOCUMENTS 3,772,537 11/1973 Clifford et al. ..................... 310/309
4,549,863 10/1985 Bourgeois ........................... 425/504
4,585,408 4/1986 Darr ................................... 425/504

*Primary Examiner*—Steven L. Stephan
*Assistant Examiner*—D. L. Rebsch
*Attorney, Agent, or Firm*—Bruce L. Adams; Van C. Wilks

[57] ABSTRACT

In in-mold labeling for applying a label or workpiece into a mold by using a robot hand apparatus, the robot hand apparatus has therein a static-electricity-generating apparatus for generating static electricity on a holding surface. The static electricity generating apparatus comprises a holding member attached to a surface of a base continuous with a hand of a robot and having a holding surface with approximately the same shape as that of the label on the side opposite to the attached surface, tungsten wires stretched using securing members in grooves opened on the side holding surface in the holding member, high-voltage cables with static electricity shields that are connected to the tungsten wires and are led to a high-voltage power source, and suction holes opened perpendicularly to the holding surface of the holding member and connected to a vacuum generating source. The electrostatic generating apparatus attracts the label to a robot hand attracting surface by negative pressure, moves the robot hand into place in the mold, gives an electrostatic charge to the label from the static electricity generating apparatus of the robot hand before and after the movement, and applies the label into the mold.

13 Claims, 4 Drawing Sheets

ROBOT HAND FOR ELECTROSTATICALLY APPLYING THIN WORKPIECE TO MOLD

FIELD OF THE INVENTION

The present invention relates to molds for injection molding and blow molding, and more particularly to a robot hand apparatus and a method for applying a thin workpiece to a mold.

DESCRIPTION OF THE PRIOR ART

To produce a molded item having a thin workpiece such as a label by a method wherein a thermoplastic resin or thermosetting resin is cooled in a mold for injection molding or blow molding, a technique called in-mold labeling is known wherein a thin work is inserted into a mold and is attached to the cavity inner surface before the molding, and the molding is effected, thereby integrating the molded item with the thin work.

As means of applying a thin workpiece such a label into a mold, there are techniques wherein a mold is formed with suction air holes at a section where the label will be held and the label will be attracted by negative pressure, and a technique wherein the work is charged with static electricity and is attached to the mold by the attractive force of the static electricity. As an example of the former, reference is made of U.S. Pat. No. 3,657,405 issued on Apr. 18, 1972. The latter technique does not require any special contrivance for the mold and therefore is used in many cases in injection molding that uses a mold having a complicated structure. In the technique that uses a static electric force, after the operator places a work on a static electricity generating apparatus situated near the molding machine, thereby charging the work with electricity, the mold is opened, then the molded item is removed, and the workpiece is attached in place in the mold. However, in this prior technique, since the amount of the charge is not very stably generated because of the properties of static electricity, if, for example, it takes too much time to remove the molded item, the attraction between the work and the mold becomes weak, leading to such problems that the work is not attracted in the mold, or the work is displaced in the mold, for example, due to the injection pressure at the molding. Further, since the workpiece is positioned in the mold by one's hand, there is a problem that the static electricity retained in the workpiece decreases during the operation.

SUMMARY OF THE INVENTION

In the present invention, to solve the above drawbacks of the prior art, according to a first embodiment of the present invention, there is provided a robot hand apparatus for applying a thin workpiece into a mold, which robot hand apparatus has a static electricity generating apparatus for generating static electricity on a holding surface. This static electricity generating apparatus comprises a holding member attached to one side of a platelike base continuous with an arm of a robot and having a holding surface with substantially the same shape as that of the workpiece on the side opposite to the side where the base is attached, tungsten wires stretched in grooves opened on the side of said holding surface in the holding member using securing members, high-voltage cables with static electricity shields that are connected to the tungsten wires and are led to a high-voltage power source, and a plurality of suction holes opened perpendicularly to the holding surface of the holding member and connected to a vacuum generating source. The electrostatic generating apparatus attracts the label to a robot hand attracting surface by negative pressure, moves the robot hand in place in the mold, gives static electricity to the label by the static electricity generating apparatus of the robot hand before and after the movement, and applies the label into the mold.

In the first embodiment, since the high-voltage power source positioned at a fixed section and the tungsten wires provided at the arm forward end that is a movable section are connected by high-voltage cables, if the cables are broken, there is a possibility that a fire will occur or people are endangered.

To avoid this, according to a second embodiment, the high-voltage power source is positioned at the base that is a movable section, and is connected to the static electricity generating apparatus.

According to a third embodiment, in a robot hand apparatus for applying a label into a mold, a static electricity generating apparatus for generating static electricity on a holding surface is provided. The static electricity generating apparatus consists of a frame member attached to an arm forward end of a robot and having a workpiece abutting member with substantially the same shape as that of the label on one side, tungsten wires stretched by securing member in grooves in the frame member opened on the side of the work abutting section, and high-voltage cables with static electricity shields connected to the tungsten wires and lead to a high-voltage source. A label held by a workpiece holding member is abutted on the workpiece abutting member by moving the robot hand, the label is separated from the workpiece holding member by the static electricity generating apparatus to be attracted to the workpiece abutting section, and the robot hand is moved to a prescribed place in the mold to apply the label into the mold.

According to a fourth embodiment, in order to prevent several labels from occasionally sticking and being held together due to the static electricity, the static electricity of the labels in a work magazine is previously removed by a static electrification preventing apparatus when the label is attracted to the robot hand attraction surface.

Other objects, features, and effects of the present invention will become apparent from the detailed description of the embodiments shown in the attached drawings.

DETAILED DESCRIPTION OF THE PREFERRED EMBODIMENTS

Figure 1:
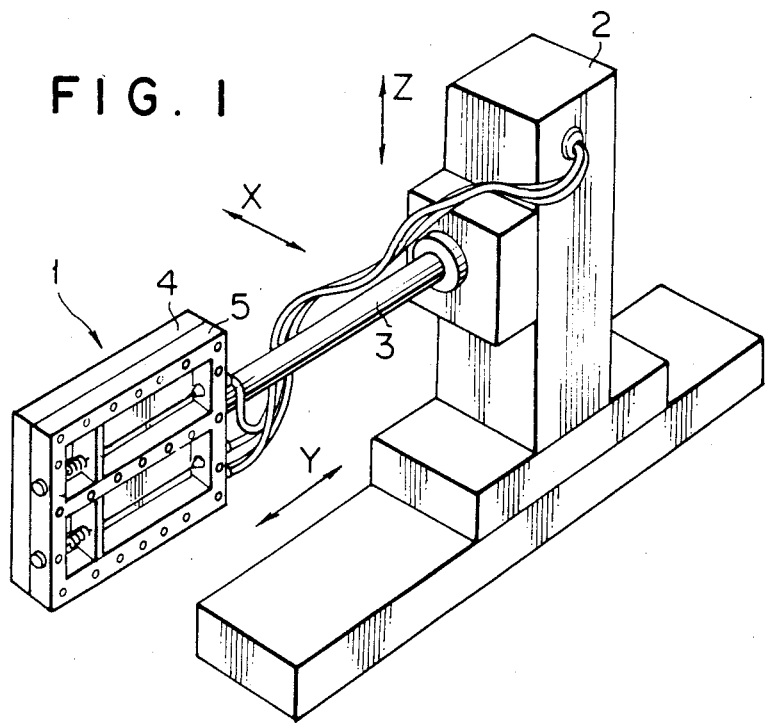
FIG. 1 is a perspective view of a robot that uses a robot hand of a first embodiment of the present invention.

A first embodiment of the present invention will be described with reference to FIGS. 1 to 6. FIG. 1 shows the appearance of the robot 2 of an X-Y-Z rectangular coordinate system, and reference numeral 1 indicates a hand for holding a workpiece (label) attached to the forward end of an arm 3 of the robot 2. The hand 1 is connected to the arm 3 through a base 4 that is attached to, the forward end of the arm in parallel with a line extending from the arm 3 and has opposed surfaces in the shape of a plate in the appearance of a rectangular parallelepiped. A holding member 5 having substantially the same external dimension as that of the base 4 is attached on one of the opposed surfaces of the base 4 in an overlaid manner.

Figure 2:
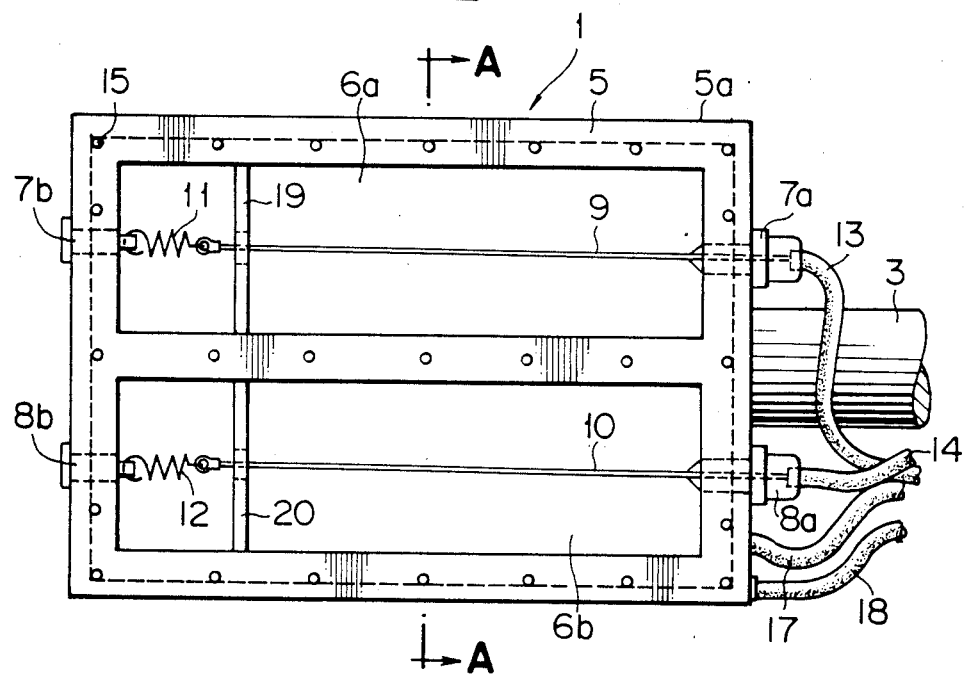
FIG. 2 is a front view of the first embodiment of the present robot hand.

Referring to FIG. 2, the holding member 5 has a holding surface 5a that has substantially the same shape as that of a workpiece (e.g., a label) and is positioned on the side opposite to the surface where the base 4 is attached. The holding member 5 is formed with grooves 6a and 6b opened on the side of the holding surface 5a. Tungsten wires 9 and 10 are stretched in the grooves 6a and 6b respectively with the opposite ends of the tungsten wires 9 and 10 secured by securing members 7a, 7b, 8a and 8b made of a non-conductor such as ceramics or plastics. Reference numerals 11 and 12 indicate springs for tensing the tungsten wires 9 and 10. Reference numerals 13 and 14 indicate high-voltage cables having electrostatic shields and connected to the tungsten wires 9 and 10. Reference numeral 18 indicates an earthed or grounded conductor connected to the holding member 5. The material of the holding member 5 is a conductive material such as aluminum and iron. Reference numerals 19 and 20 indicate dividers.

Figure 3:
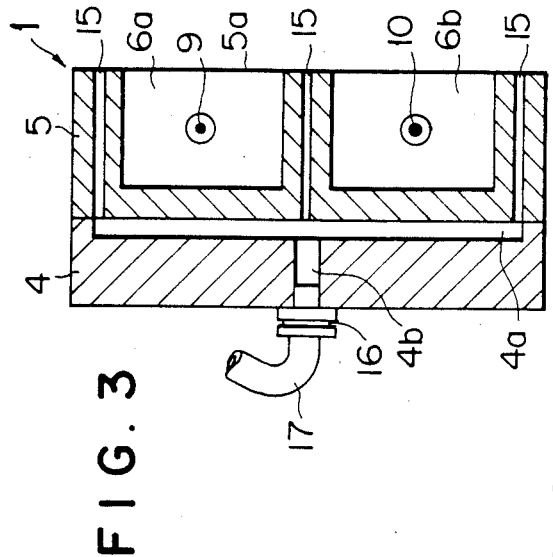
FIG. 3 is a side view taken along line A—A of FIG. 1.

Referring to FIG. 3, a plurality of suction holes 15 are drilled in the holding surface 5a of the holding member 5 and are extended perpendicularly to the holding surface 5a. The suction holes 15 are extended through the holding member 5, and are in communication with an air chamber 4a defined between the base 4 and the attached surface of the holding member 5. The air chamber 4a is in communication with a tube 17 through a conduit 4b and a joint 16. The tube 17 is connected to a vacuum generating source (not shown).

Figure 4:
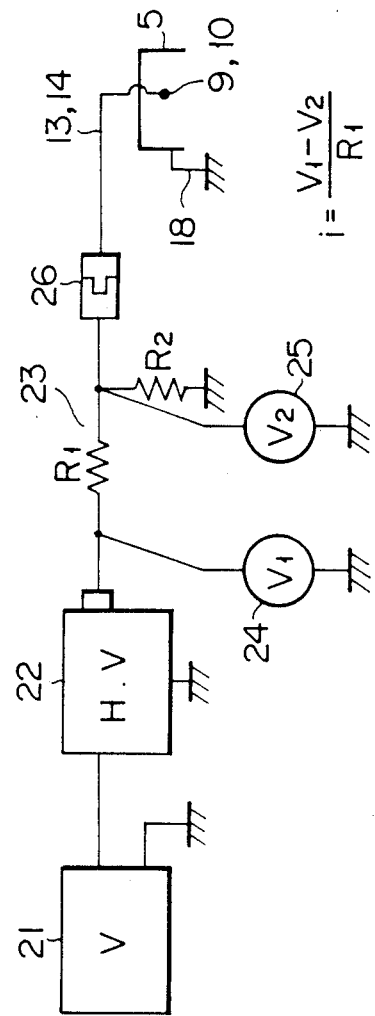
FIG. 4 is a circuit diagram of the first embodiment.

FIG. 4 shows a circuit, wherein reference numeral 21 indicates a constant-voltage regulated power source, and reference numeral 22 indicates a high-voltage power source. Reference numeral 23 indicates a resistor, reference numerals 24 and 25 indicate voltmeters for the measurement of potential difference, and reference numeral 26 indicates a connector.

Figure 5:
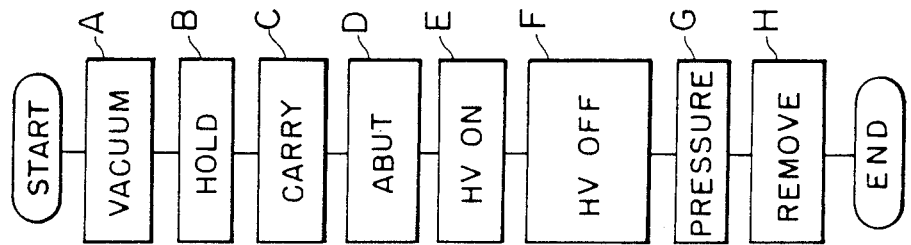
FIG. 5 is a flow chart showing the operation of the present invention.
Figure 6:
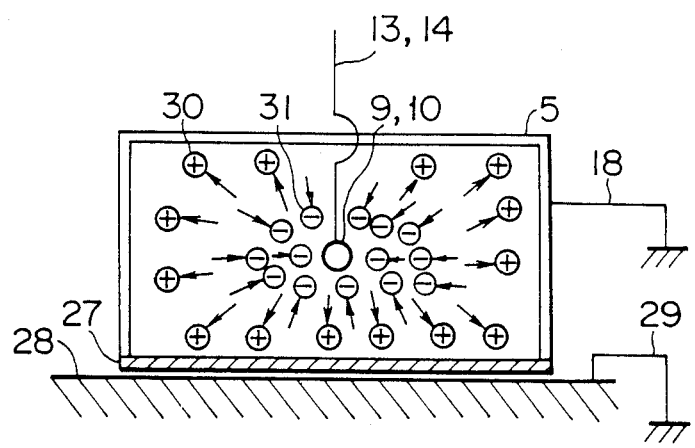
FIG. 6 is an explanatory diagram showing the charged state.

Referring to the flow chart shown in FIG. 5, and also referring to FIG. 6, the operation will now be described. First, by the robot 2 the hand 1 is moved to the escape position of a label magazine and is abutted on a label. Then, the vacuum generating source (not shown) is operated to start (A) creating of a vacuum to hold (B) the label. After the hand 1 is moved (C) to the mold surface by the robot 2, the label is abutted (D) against the mold. Then, the constant-voltage regulated power source 21, and the high-voltage power source 22 are operated to turn on (E) the high-voltage power source. FIG. 6 shows the state at that time. Reference numeral 27 indicates the workpiece in the form of a label 28 indicates a mold, 29 indicates a ground connecting to the mold 28, and 30 and 31 indicate plus ions and minus ions respectively. Since the high-voltage power source has been turned on, a high voltage is applied to the tungsten wires 9 and 10. At that time, if the electrode distance (the distance between the tungsten wires 9 and 10 and the holding member 5) is made to be 10 to 15 mm, and the voltage is made to be 5 to 15 kV, the electric field intensity is made to be on the order of 100 (V/m), and ions are liberated in the holding member 5. When a positive voltage is applied to the tungsten wires 9 and 10, the plus ions 30 move away from the tungsten wires that are central electrodes whereas the minus ions 31 reach the central electrodes to be neutralized. The plus ions 30 repelled from the central electrodes reach the label 27 on the opening 5a(label holding surface) of the holding member 5 that is the external electrode, thereby charging the label 27 with the ions. When the label 27 is charged with electricity, a static electric force is exerted between the label 27 and the mold 28 since the mold 28 against which the label 27 is abutted is grounded, so that the label 27 is attracted to the mold 28. Then, the vacuum generating apparatus (not shown) is turned off to end the vacuuming, and the voltage power source is turned off (F). While blowing (G) is carried out through the suction holes, the robot 2 is operated to move away (H) the hand 1 from the surface of the mold 28. Since the label 27 is charged with electricity and remains attracted to the surface of the mold 28, after moving the robot 2 aside, the mold can be closed to carry out the molding.

Figure 7:
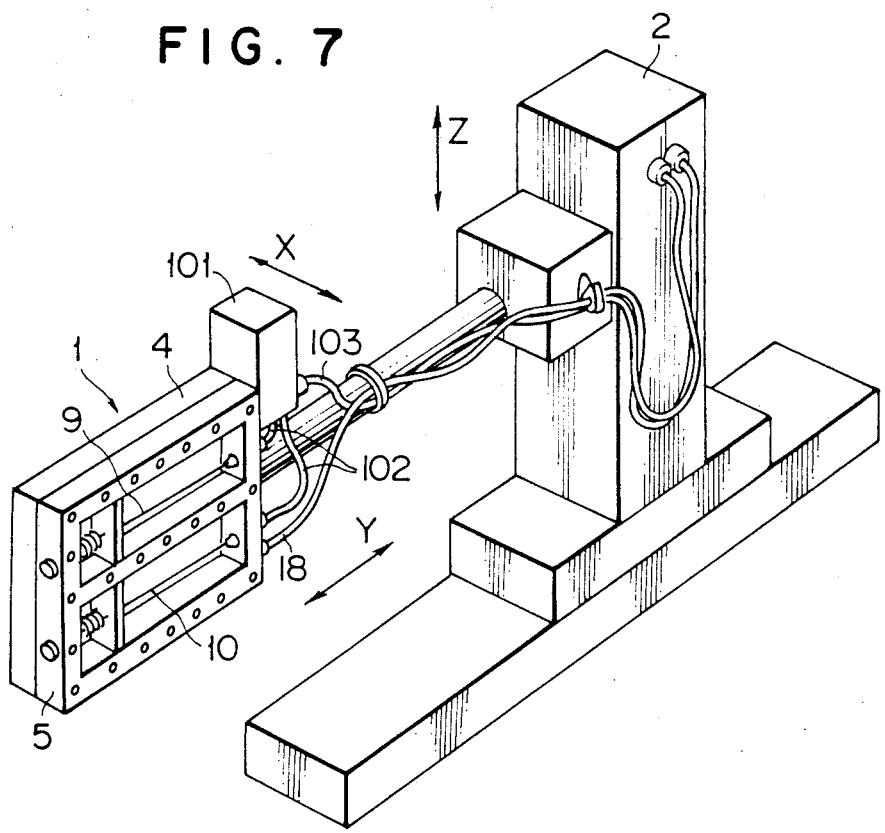
FIG. 7 is a perspective view of a second embodiment of the present invention.

A second embodiment of the present invention will be described with reference to FIG. 7. Reference numeral 101 indicates a high-voltage power source (high-voltage generating unit) fixed to the base 4. Reference numeral 102 indicates high voltage cables which connect the high-voltage power source 101 and the tungsten wires 9 and 10; 103 indicates a robot cable connecting the high-voltage power source 101 to a power source (not shown).

In the first embodiment, since the high-voltage power source positioned at a fixed section and the tungsten wires at the arm forward end that is a movable section are connected by the high-voltage cables, there is a risk that wires in the high-voltage cables are broken because the cables are moved, and if the wires are broken, there is a possibility that a fire will occur or people will be endangered. Since the high-voltage cables have a large cross sectional area and are difficult to bend, if the speed of the movement of the robot is high, the load of the cables on the robot becomes high. The shield will be broken earlier than the cables, and if the shield is broken, there is a possibility that the wiring in apparatuses such as sensors in the robot will have noise due to electrostatic induction.

In the second embodiment, the high-voltage power source 101 is provided to the base 4 that is a movable section to shorten as far as possible the high-voltage cables 102 connecting the high-voltage power source 101 and the tungsten wires 9 and 10, and since the high-voltage power source 101 and the power source for supplying electric power thereto that is positioned at a fixed section are connected through the high-voltage cables 102 that are less liable to be broken, the above problems can be obviated.

The high-voltage cables are provided with shields whose end is ground. The high-voltage power source and the static electricity generating apparatus may integrated. In this case, the high-voltage cables for the connection are not required.

A third embodiment of the present invention will be described with reference to FIGS. 8 to 10.

Figure 8:
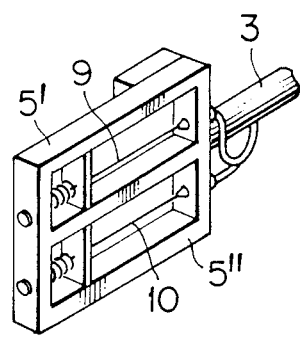
FIGS. 8 to 10 are perspective views of parts of a third embodiment of the present invention.

Referring to FIG. 8, a frame member 5' having a work abutting section 5" with substantially the same shape as that of a label is fixed to the forward end of the arm 3 of the robot hand apparatus. The tungsten wires 9 and 10 that are connected to the high-voltage power source are stretched in the frame member 5'.

Figure 9:
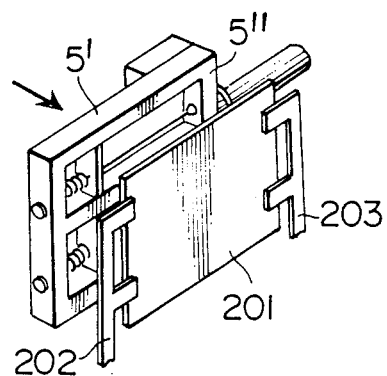

Referring to FIG. 9, the robot is moved in such a manner that the label abutting section 5' is opposed to a label 201. The label 201 is held by holding members 202 and 203. In holding the label 201, the contact area between the label 201 and the label holding members 202 and 203 is much smaller than the contact area that will be formed between the label abutting member 5" and the label 201, and when a force is applied perpendicularly to the surface of the label 210, the label 201 can be separated from the holding members 202 and 203.

Figure 10:
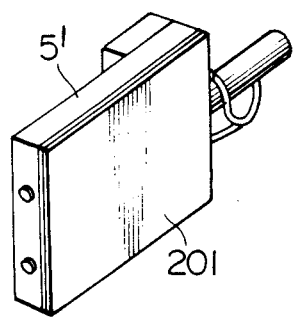

Referring to FIG. 10, the robot is moved to cause the frame member 5' to abut against the work 201. Then, when the high-voltage power source (not shown) is operated to pass electricity to the tungsten wires 9 and 10 to generate static electricity, the label 201 is attracted to the frame member 5' since the frame member 5' has a contact area larger than that of the holding members 202 and 203. Then, when the robot is moved reversely, the label 201 is separated from the holding members 202 and 203 and is held by the robot. The robot with the label 201 is moved to abut the label 201 on the mold, to which the work 201 is to be transferred. Then, since the surface area of the mold is larger than that of the label abutting section 5" of the frame member 5', the label 201 is attracted to the mold.

Figure 11:
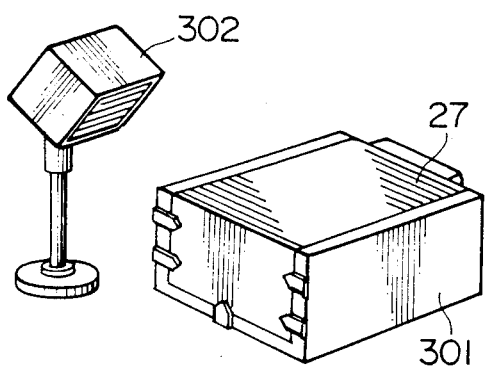
FIG. 11 is a perspective view of a fourth embodiment of the present invention.

A fourth embodiment of the present invention will be described with reference to FIG. 11. When suction attraction or static electricity attraction is carried out by the robot hand 1, sometimes labels in a magazine 301 are charged already with electricity, and are attracted to each other, and two or more labels are held together. To prevent this problem, a commercially available static charge preventing apparatus 302 may be positioned near the magazine to remove the static electricity of the labels 27 in the magazine thereby allowing only a single label 27 to be held positively.

The effect of the present invention resides in that a label can be charged with electricity with the label held by the robot, and immediately after or within a short period after charging the label, the label is brought in contact with the mold, to which the label is to be transferred, so that the attraction of the label to the mold can be made positive.

Since the hand of a person is not involved, and therefore the static electricity given to the label will be lost less during the operation, the certainty of the attraction can be enhanced.

In the present invention, although tungsten wires are used as the central electrodes, metal conductors of other material having a high melting point and excellent oxidation resistance can be used therefor so long as the effect of the present invention is not lost.

Further, instead of the wire material, a rodlike body having a number of needlelike projections extended toward the label can be used.

Further, although the mold may have the same, grounded conductor as that of other apparatus to increase the attractive force of the mold to the label, if the amount of charge of the label is enough for the required attraction, the grounded conductor can be omitted. However, in that case, it is desirable that electrical insulation (using, for example, rubber or plastic) is provided between the label and the holding apparatus.

Further, in order to increase the amount of charge of the label, it is effective to provide a fan behind the label.

Further, instead of escaping the label by the robot, the work may be supplied to the hand manually.

What is claimed is:

1. A robot hand apparatus for applying a thin workpiece into a mold that has a static electricity generating apparatus for generating static electricity on a holding surface, wherein said static electricity generating apparatus comprises:
    a base in the shape of a plate and attached to the forward end of an arm of said robot hand apparatus in parallel with a line extending from said arm and having opposed surfaces;
    a holding member having substantially the same external dimension as that of said base and being attached to one surface of said base in an overlaid manner, the holding member having a workpiece holding surface having substantially the same shape as that of said thin workpiece on the side opposite to the surface to which said base is attached;
    metal conductors stretched along the holding member by means of securing members in grooves opened on the side of said holding surface in the holding member;
    high-voltage cables having static electricity shields connected to the metal conductors and being connected to a high-voltage power source; and
    a plurality of suction holes opened perpendicularly to said holding surface of the holding member and connectable to a vacuum generating source.

2. The robot hand apparatus as claimed in claim 1, wherein said metal conductors are tungsten wires.

3. The robot hand apparatus as claimed in claim 1, wherein said high-voltage power source is mounted on a movable section of the robot and is connected electrically to said static electricity generating apparatus.

4. The robot hand apparatus as claimed in claim 3, wherein said high-voltage power source and a power source positioned at a fixed section are connected by a cable at a moving section of the robot.

5. The robot hand apparatus as claimed in claim 1, wherein said high-voltage power source and said static electricity generating apparatus are integrated.

6. A method of applying a thin workpiece into a mold of a robot hand apparatus having a static electricity generating apparatus for generating status electricity on a holding surface, comprising the following steps:
    attracting a thin workpiece to said robot hand holding surface by negative pressure;
    moving said robot hand in place in the mold;
    giving static electricity to said thin workpiece by said static electricity generating apparatus of said robot hand before and after the movement of said robot hand; and
    applying said thin workpiece into the mold.

7. The method of applying a thin workpiece into a mold of a robot hand apparatus as claimed in claim 6, wherein when said thin workpiece is attracted to said robot hand holding surface, the static electricity of works in a workpiece magazine is previously removed by a static electrification preventing apparatus.

8. A robot hand apparatus for applying a thin workpiece into a mold that has a static electricity generating apparatus for generating static electricity on a holding surface, wherein said static electricity generating apparatus comprises:
- a frame member attached to an arm forward end of said robot hand apparatus and having a workpiece abutting section with substantially the same shape as that of said thin workpiece on one side;
- metal conductors stretched along said frame member by means of securing members in grooves open on the side of said workpiece abutting section in said frame member; and
- high-voltage cables having static electricity shields connected to said metal conductors and being connected to a high-voltage power source.

9. The robot hand apparatus as claimed in claim 8, wherein said metal conductors are tungsten wires.

10. The robot hand apparatus as claimed in claim 8, wherein said high-voltage power source is mounted on a movable section of the robot and is connected electrically to said static electricity generating apparatus.

11. The robot hand apparatus as claimed in claim 8, wherein said high-voltage power source and a power source positioned at a fixed section are connected by a cable at a moving section of the robot.

12. A method of applying a thin workpiece into a mold of a robot hand apparatus having a static electricity generating apparatus for generating static electricity on a holding surface, comprising the following steps:
- moving said robot hand to abut a workpiece abutting section thereof against a thin workpiece held by a workpiece holding member;
- separating said thin workpiece, from said thin workpiece holding member by said static electricity generating apparatus and allowing said thin workpiece to be attracted to said workpiece abutting member; and
- moving said robot hand in place in the mold to apply said thin workpiece into said mold.

13. The method of applying a thin workpiece into a mold of a robot hand apparatus as claimed in claim 12, wherein when said thin workpiece is attached to said workpiece holding member, the static electricity of workpieces in a workpiece magazine is previously removed by a static electrification preventing apparatus.

* * * * *